United States Patent

[11] 3,579,142

[72] Inventor Vern N. Smiley
 San Diego, Calif.
[21] Appl. No. 842,938
[22] Filed July 18, 1969
[45] Patented May 18, 1971
[73] Assignee The United States of America as represented by the Secretary of the Navy

[54] THIN FILM LASER
 11 Claims, 4 Drawing Figs.
[52] U.S. Cl. ............................................. 331/94.5
[51] Int. Cl. ............................................. H01s 3/05
[50] Field of Search ................................. 331/94.5

[56] References Cited
UNITED STATES PATENTS

| | | | |
|---|---|---|---|
| 3,245,002 | 4/1966 | Hall | 331/94.5 |
| 3,349,475 | 10/1967 | Marinace | 29/578 |
| 3,359,508 | 12/1967 | Hall | 331/94.5 |
| 3,363,195 | 1/1968 | Furnanage et al. | 331/94.5 |
| 3,431,437 | 3/1969 | Kosonocky | 307/312 |

OTHER REFERENCES

Johnson et al.: "Optically Pumped Thin-Platlet Semiconductor Lasers", JOURNAL OF APPLIED PHYSICS, vol. 39, pp. 3977— 3985, July, 1968

Stillman et al.: "Volumn Excitation of an Ultrathin Single-Mode Cdse Laser", APPLIED PHYSICS LETTERS, vol. 9, pp. 268— 269, Oct., 1966

Primary Examiner—Ronald L. Wibert
Assistant Examiner—Edward S. Bauer
Attorneys—Joseph C. Warfield, Jr., George J. Rubens and John W. McLarne ABSTRACT: A laser assembly comprises a source of exciting or pumping energy, a thin film of laser material supported to intercept a path of the exciting energy, the film having a thickness of the order of one wavelength of the radiant energy emitted by the laser. The film is positioned at an angle relative to the exciting energy for producing a laser beam which is substantially perpendicular to the plane of the film and therefore a much larger aperture than had been realized with prior thin film lasing materials. In a preferred form, multilayer reflective coatings intensify and enchance the laser beam produced perpendicularly to the plane of the film.

PATENTED MAY 18 1971   3,579,142

INVENTOR.
VERN N. SMILEY
BY
ATTORNEYS

THIN FILM LASER

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED APPLICATIONS

The subject matter of this patent application is generally related to copending patent applications titled "Very Wide Range Continuously Tunable Thin Film Laser," Ser. No. 842,914, filed under date of July 18, 1969, "Thin Film Tunable Laser Oscillator Amplifier," Ser. No. 842,939, filed under date of July 18, 1969, and "Thin Film Laser Continuously Tunable by Electric Field," Ser. No. 842,915, filed under date of July 18, 1969, all in the name of applicant.

BACKGROUND OF THE INVENTION

Prior art thin film lasers have been developed where the laser beam which is produced is generated parallel to the plane of the thin film. Accordingly, the laser beam aperture is relatively small in one direction, i.e., the thickness of the film, resulting in beam spreading due to diffraction defects. Examples of such thin film lasers are described by Herwitz, Calawa, and Redicker in the IEEE Journal of Quantum Electronics, Volume QE-1, at pages 102—103 which appeared in May 1965 and the Cusano and Kingsley disclosure in the Applied Physics Letters, Volume 6, 05, pages 91—93 which appeared in 1965.

Still more recently semiconductor lasers with radiating mirrors have been demonstrated to be capable of generating a laser beam in a direction perpendicular to the axis of the exciting beam of electrons or light energy, as the case may be, and also perpendicular to the plane of the film of lasing material such as described by Basov, Bogdankevich, and Grasyuk in the IEEE Journal of Quantum Electronics, volume 2E-2, 09, pages 594—597 which appeared in Sept. 1966. These laser assemblies were characterized by the authors of that article as "radiating mirrors" comprising a thin film of semiconductor lasing material deposited on a massive substrate which functioned in the manner of a heat sink. The so-called thin film, were of the order of 100 wavelengths of the source of radiant energy emitted by laser action.

SUMMARY OF THE INVENTION

The present invention comprises a thin film of laser material which may be any one of numerous materials which have been found to be capable of lasing. Presently preferred materials for the purposes of present invention may be CdSe, CdS or other semiconductor materials; however, any one of many laser materials can be employed within the concept of the present invention according to the particular application in which it is used and the specific results desired in terms of the operating wavelength, bandwidth of frequency of laser output desired, the amount of output energy required, etc.

In accordance with the concept of the present invention, the thin film of laser material is preferably supported on a substrate such as glass or quartz or any other suitable material and is positioned to intercept the path of a source of exciting or pumping energy in the form of noncoherent light, coherent light, or an electron beam. The exciting energy may be the output from a gas discharge device, such as a Xenon lamp, the output of another laser, or an electron beam. The concept of the present invention contemplates that the thin film of laser material must be of a thickness of the order of 1 wavelength of the emitted laser energy and a multiple of one-half wavelength. The laser energy which is developed when the laser material is brought up to a lasing level is emitted substantially perpendicular to the plane of the film of laser material. As a result, a large aperture is realized rather than the very long and narrow aperture of prior art thin film lasers where the laser emission took place principally out of the edge of the thin film of laser material.

Moreover, the concept of the present invention, which inherently embraces a thin film of laser material having a thickness of the order of 1 wavelength of the emitted laser energy, facilitates penetration of the laser material by the exciting energy and its absorption of the exciting energy with significantly more facility and efficiency than other thin films, such as those reported by Basov et al. where the thin film was several orders of magnitude greater in thickness i.e. approximately 100 wavelengths of the emitted energy. Additionally, the thicker film laser device are preferably pumped with an electron beam rather than optically pumped because of the problem posed by the large absorption of energy in a thick film of laser material. It is possible that the thicker film of laser material, as employed in the prior art, may be pumped optically but this is in contrast to the present invention which offers the capability of being pumped optically with single photon absorption as well as two photon absorption. Thus, the ease and facility of pumping the laser material is demonstrably better with the thin film laser having a thickness of the order of 1 or 2 wavelengths of the emitted energy as conceived and taught by the present invention.

The laser material employed in the thin film concept of the present invention may comprise a semiconductor material, a dielectric, or a liquid. In its preferred embodiment the present invention may comprise a thin film of solid laser material which is divided or compartmented to reduce the possibility of oscillation buildup developing along the plane of the film. Furthermore, in some instances it may be desirable to have multiple thin film buildup of layers of lasing material to provide interaction between the multiple layers producing desired results for particular application.

In a preferred embodiment of the present invention, the thin film of laser material may be employed with multiple layers of dielectric reflective material in a thin film configuration and having alternate high and low indices of refractions. This arrangement would preferably be configured with the multiple layer of dielectrics on either side of the principal plane of the thin film of laser material so as to enhance the lasing radiation developed by the laser material.

Accordingly, it is a principal object of the present invention to provide a laser assembly of a thin film of laser material configuration which facilitates and enhances the absorption of energy pumped into the lasing material.

Another object of the present invention is to provide a thin film laser assembly which may be optically pumped with energy by single photon absorption.

Yet another object of the present invention is to provide a thin film laser assembly which is capable of being pumped optically with a source of coherent light as well as noncoherent light.

A further object of the present invention is to provide a thin film laser assembly which satisfies the foregoing objectives and is capable of being pumped electronically as well as optically.

These and other objects, advantages and features of the present invention will be more clearly appreciated from the description of several embodiments of the inventive concept which follow together with illustrative drawings.

DESCRIPTION OF THE PREFERRED EMBODIMENT

Figure 1:
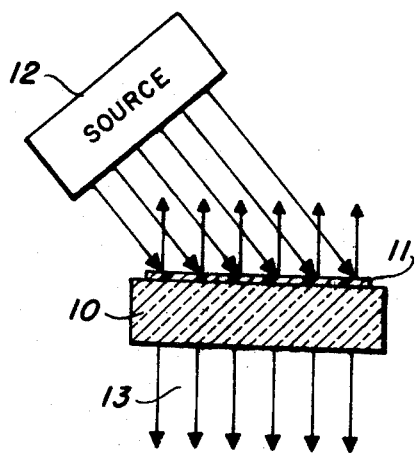
FIG. 1 is a partially cross-sectional, schematic illustration of one form of the present invention.

FIG. 1 illustrates a basic configuration embodying the concept of the present invention. A substrate member 10 which may be of glass or quartz, for example, supports a thin film 11 of solid laser material. A source of exciting energy 12 is positioned in a direction so that its radiation is intercepted by the thin film of laser material on the substrate 10. The source 12 may be of any appropriate character which produces sufficient energy within a wavelength spectrum required to cause the thin film of laser material 11 to reach a lasing level. Accordingly, the exciting energy source 12 may comprise a gas discharge device such as a Xenon tube.

Normally the wavelengths in an optical source are shorter than some limiting value such as the band gap absorption wavelength of a semiconductor. In any case, the source wavelength is shorter than the emitted wavelength for single photon excitation.

Alternatively, the exciting energy source 12 may comprise the substantially monochromatic source of coherent radiant energy such as another laser. In yet another variant embodiment of the present invention, the source of exciting energy 12 may comprise an electron beam generating apparatus.

It is to be appreciated that the concept of the present invention is such that the thin film of laser material as illustrated at 11 in FIG. 1 may be optically or electronically pumped to reach a lasing level of energy. The thin film of laser material 11 must be, however, of a thickness of the order of 1 wavelength of the emitted energy and a multiple of one-half wavelength. Upon reaching a lasing state by the absorption of energy from the energy source 12, the thin film 11 produces laser energy in a beam 13 having an aperture which may be as large as the entire plane of the thin film. Thus the thin film 11, within the concept and teaching of the present invention, produces a laser beam 13 through an aperture which is substantially perpendicular to the plane of the thin film 11. This has the advantage of obviating spreading of the beam due to diffraction effects as with thin film lasers caused to lase in a direction parallel to the plane of the film.

The thin film material, as contemplated by the present invention, must be of the order of one wavelength of thickness of the radiant energy which it is designed to emit and a multiple of one-half wavelength. Such material may comprise a semiconductor, a dielectric, or liquid.

Figure 2:
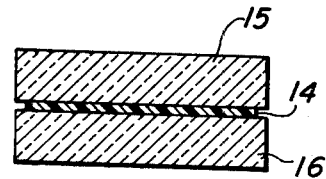
FIG. 2 is a cross-sectional view of a form of the present invention employing a thin film of liquid.

FIG. 2 illustrates a liquid thin film 14 which may be positioned between two glass plates 15 and 16 or other appropriate means to contain the liquid in the desired thickness. The assembly of FIG. 2 is placed in substantially the same position as the thin film 11 of FIG. 1 which is supported on the substrate material 10 so as to receive exciting energy from the source 12 and produce a laser beam as indicated generally at 13 which is perpendicular to the plane of the film. The liquid film embodiment produces the same highly advantageous large aperture within the contemplation of the present invention. The arrangement illustrated in FIG. 2 includes a thin film of liquid 14 which, in accordance with the concept of the present invention, must be of the order of 1 wavelength in thickness relative to the radiant energy emitted and a multiple of one-half wavelength.

Figure 3:
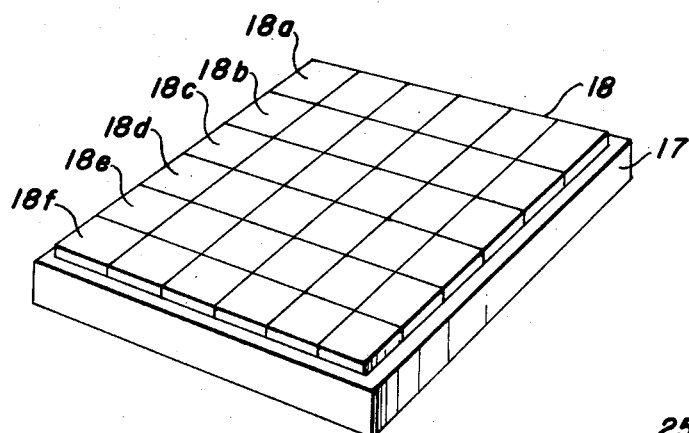
FIG. 3 is an isometric view of a variant-embodiment of the present invention.

FIG. 3 illustrates a variant embodiment of the present invention which comprises a substrate 17 supporting a thin film 18 thereon. The thin film of laser material 18 is of the order of 1 wavelength in thickness relative to the wavelength of the radiant energy emitted from the laser. The thin film 18 is divided into a plurality of sections as indicated generally at 18a, 18b, 18c, 18d, 18e, 18f, etc. The purpose of dividing the thin film into cells or compartments as illustrated in FIG. 3 is to reduce the possibility of oscillation buildup along the plane of the film. The thin film 18 may be carefully scribed to divide it into an appropriate number of cells, compartments, or sections to achieve the desired results.

Figure 4:
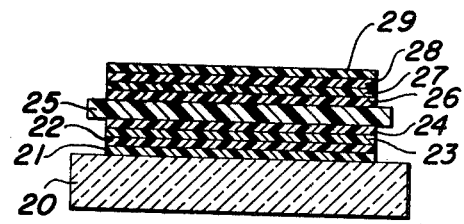
FIG. 4 is a cross-sectional view of a form of preferred embodiment of the present invention including multiple layers of reflective dielectric materials.

FIG. 4 illustrates a variant embodiment of the present invention which includes a substrate 20 of appropriate material supporting thereon multiple layers 21, 22, 23 and 24 of dielectric materials having alternate high and low indices of refraction. Over such multiple layers 21, 22, 23, and 24 is a thin film of laser material 25 of a thickness of 1 wavelength of the radiant laser energy emitted and a second multiplicity of dielectric reflective layers 26, 27, 28 and 29. The first group of multilayer dielectric reflective material comprising the layers 21, 22, 23, and 24, has alternate high and low indices of reflection; the second group of multiple layers 26, 27, 28, and 29 of dielectric material similarly has alternate high and low indices of refraction. The thickness of the layers is chosen so as to offer high reflectance at the laser emission wavelength and low reflectance for the exciting or pumping wavelength thus facilitating absorption of exciting radiation by the laser film and at the same time providing an efficient cavity for the laser wavelength. This desirably improves the performance of the assembly in accordance with the concept of the present invention. The number of dielectric layers may be increased or decreased. A larger number of layers results in a more efficient cavity and lowers the amount of exciting or pump energy required to produce lasing action.

Alternatively, the lower multiple layer dielectric reflective material comprising the group of layers 21, 22, 23, and 24 may be eliminated so that the thin film of laser material 25 is deposited upon and supported by the substrate base 20 directly. The second group of multiple multilayer dielectric effective materials comprising the layers 26, 27, 28, and 29 of alternate high and low indices of refraction would be supported by the thin film of laser material 25 and operate in much the same manner within the concept and teaching of the present invention.

The arrangements shown in FIGS. 2, 3, and 4 are conceived and intended to be employed within the concept of the present invention so as to be positioned in place of the assembly comprising the substrate 10 and the thin film of laser material 11 as shown in FIG. 1 relative to the source of exciting energy 12 to produce a laser beam 13.

From the foregoing description of several variant embodiments of the present invention it can be appreciated by those knowledgeable in the art that the novel concept provides a laser output through a desirably large aperture by energy pumping which is facilitated through employment of an extremely thin layer of laser material.

Moreover, the inventive concept readily lends itself to embodiment in a number of forms such as solid laser materials of different kinds and liquid laser materials, as well. Further, the present invention may be pumped with an energy source of optical or electronic character, and when optically pumped, either single photon or double photon absorption may be achieved.

In the described preferred embodiments employed for purposes of illustration and explanation it should be appreciated that the illustrations of the figures are now drawn to scale in the interests of simplicity and clarity in understanding their respective manners of operation. Those skilled and knowledgeable in the art will appreciate that the extremely thin films and coatings referred to in the foregoing explanations are of the order of a relatively few wavelengths of the energy involved and that the proportions shown in the illustrated embodiments are not intended to be a scalar representations.

Obviously many modifications and variations of the present invention are possible in the light of the above teachings. It is therefore to be understood that within the scope of the appended claims the invention may be practiced otherwise than as specifically described.

I claim:

1. A laser assembly comprising:
    an external source of exciting energy for pumping said laser;
    a thin film of laser material supported to intercept the path of said exciting energy, said film having a thickness of the order of 1 wavelength of the emitted laser energy and being divided into a plurality of discrete areas for preventing the buildup of oscillations in the plane of the film; and means positioning said film at an angle relative to said exciting energy for producing a laser beam aperture substantially perpendicular to the plane of said film.

2. A laser assembly as claimed in claim 1 wherein the thickness of said thin film of laser material is a multiple of one-half wavelength of the emitted laser energy.

3. A laser assembly as claimed in claim 1 wherein said exciting energy comprises coherent light.

4. A laser assembly as claimed in claim 1 wherein said exciting energy comprises an electron beam.

5. A laser assembly as claimed in claim 1 wherein said laser material comprises a semiconductor.

6. A laser assembly as claimed in claim 1 wherein said laser material comprises a dielectric.

7. A laser assembly as claimed in claim 1 wherein said laser material comprises a liquid.

8. A laser assembly as claimed in claim 1 and including at least one layer of material on said laser material having a high reflectance at the laser emission wavelength.

9. A laser assembly as claimed in claim 8 and including multiple layers of material on at least one side of said laser material;
said multiple layers having alternate high and low indices of refraction.

10. A laser assembly as claimed in claim 8 wherein said layer of material on said laser material offers high reflectance at said laser emission wavelength and relatively low reflectance at the wavelength of the exciting energy.

11. A laser assembly as claimed in claim 8 wherein said multiple layers are disposed on either side of said thin film of laser material.